US011294338B2

(12) United States Patent
Bettinger et al.

(10) Patent No.: US 11,294,338 B2
(45) Date of Patent: Apr. 5, 2022

(54) USE OF COMPREHENSIVE ARTIFICIAL INTELLIGENCE IN PRIMARY INDUSTRY PLANTS

(71) Applicants: Primetals Technologies Germany GmbH, Erlangen (DE); Primetals Technologies Austria GmbH, Linz (AT)

(72) Inventors: Dieter Bettinger, Plesching (AT); Kurt Herzog, Wilhering (AT); Thomas Kuehas, Luftenberg (AT); Matthias Kurz, Erlangen (DE); Andreas Maierhofer, Marloffstein (DE); Thomas Matschullat, Eckental (DE); Günther Winter, Neunkirchen/Brand (DE)

(73) Assignees: PRIMETALS TECHNOLOGIES GERMANY GMBH; PRIMETALS TECHNOLOGIES AUSTRIA GMBH

( * ) Notice: Subject to any disclaimer, the term of this patent is extended or adjusted under 35 U.S.C. 154(b) by 499 days.

(21) Appl. No.: 16/332,873

(22) PCT Filed: Aug. 31, 2017

(86) PCT No.: PCT/EP2017/071827
§ 371 (c)(1),
(2) Date: Mar. 13, 2019

(87) PCT Pub. No.: WO2018/050438
PCT Pub. Date: Mar. 22, 2018

(65) Prior Publication Data
US 2019/0361409 A1 Nov. 28, 2019

(30) Foreign Application Priority Data
Sep. 13, 2016 (EP) .................................... 16188584

(51) Int. Cl.
*G05B 19/41* (2006.01)
*G05B 13/02* (2006.01)
(Continued)

(52) U.S. Cl.
CPC ..... *G05B 13/0265* (2013.01); *G05B 19/4184* (2013.01); *G05B 2219/31368* (2013.01);
(Continued)

(58) Field of Classification Search
CPC ........... G05B 13/0265; G05B 19/4184; G05B 2219/31368; G05B 2219/32128;
(Continued)

(56) References Cited

U.S. PATENT DOCUMENTS 5,566,092 A 10/1996 Wang et al. ............. 364/551.02
5,727,127 A 3/1998 Schulze Horn
(Continued)

FOREIGN PATENT DOCUMENTS

CN 1178016 A 4/1998
CN 1179840 A 4/1998
(Continued)

OTHER PUBLICATIONS

International Search Report dated Apr. 18, 2018 in corresponding PCT International Application No. PCT/EP2017/071827.
(Continued)

*Primary Examiner* — Michael J Brown
(74) *Attorney, Agent, or Firm* — Ostrolenk Faber LLP

(57) ABSTRACT

An automation system (1) determines control data (S'), outputs same to controlled elements (5) of the facility (ANL) and thereby controls the facility (ANL). Sensor devices (2) acquire measurement data (M) of the facility (ANL) and at least partly feed same to the automation system (1) and a man-machine interface (3). Said man-machine interface (3)
(Continued)

Figure 1:
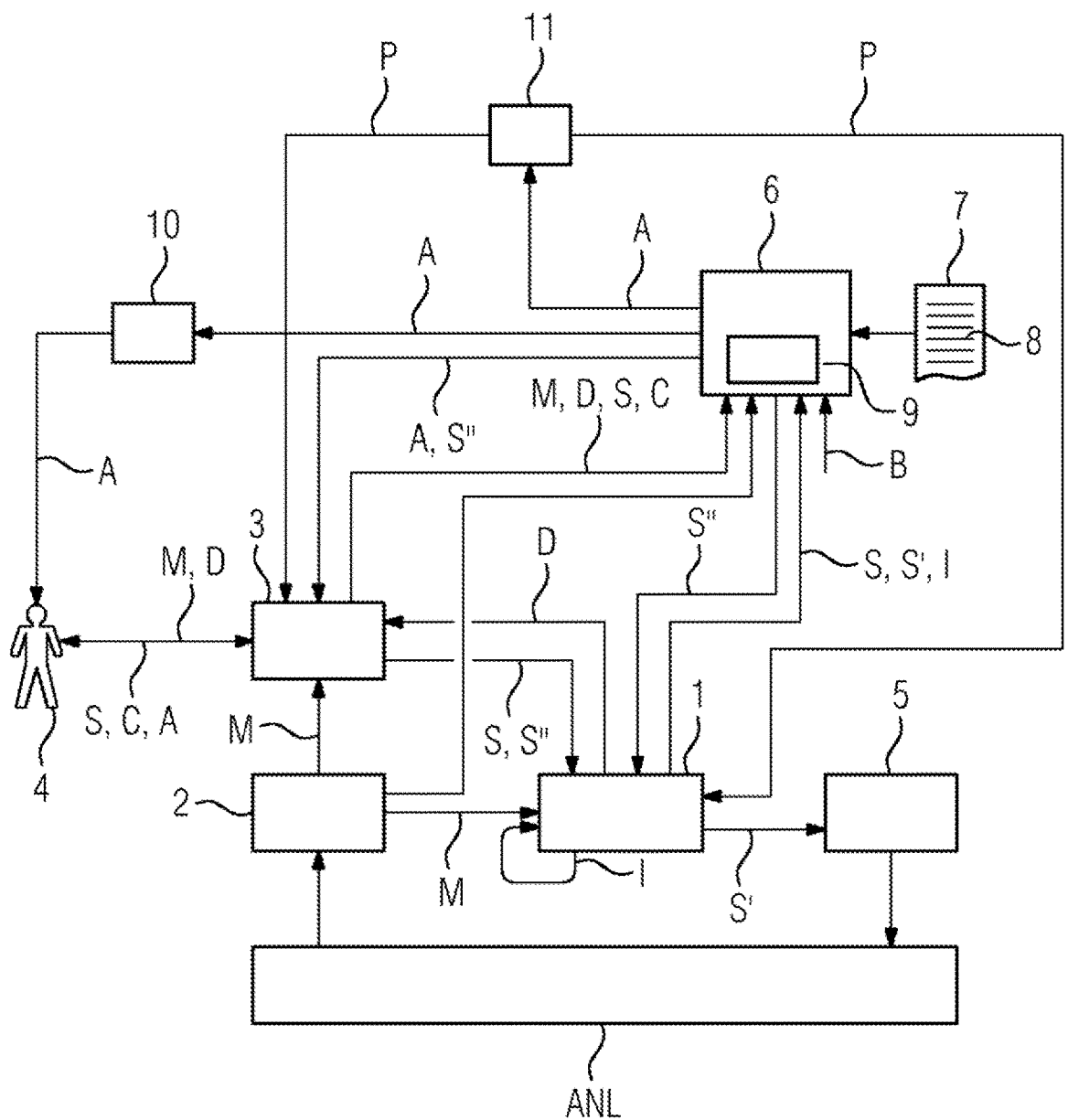

receives planning data (P) from a production planning system (11) and/or control data (S') and/or internal data (I) from the automation system (1). The interface outputs the data (M, S', I) to a person (4). It furthermore receives control commands (S) from the person (4) and forwards them to the automation system (1). The automation system (1) processes the measurement data (M) and the control commands (S) when determining the control data (S'). An artificial intelligence unit (9) receives at least part of the measurement data (M), control data (S') and/or internal data (I) and the data output to the person (4). It also receives the control commands (S). The artificial intelligence unit (9) processes the data (M, S', I) and control demands (S) received and determines evaluation results (A) therefrom and makes the latter available to the person (4) and/or to the production planning system (11) and/or sets them for the automation system (1) in the form of control commands (S'') directly or via the man-machine interface (3). The data (M, S', I) received by the artificial intelligence unit (9) are at least to some extent dimensional data. Said dimensional data (M, S', I) comprise at least one image captured by a sensor device (2) or an image output via the man-machine interface (3), part of such an image, a time sequence of such images or a time sequence of a part of such images or an acoustic oscillation or an acoustic oscillation spectrum.

27 Claims, 7 Drawing Sheets

(51) Int. Cl.
    *G05B 19/418*     (2006.01)
    *B21B 37/00*     (2006.01)
(52) U.S. Cl.
    CPC ............ *G05B 2219/32128* (2013.01); *G05B 2219/33002* (2013.01)
(58) Field of Classification Search
    CPC ...... G05B 2219/33002; G05B 23/0254; G05B 23/0289; B21B 37/00

USPC .......................................................... 700/17
See application file for complete search history.

(56) References Cited

U.S. PATENT DOCUMENTS

| | | | |
|---|---|---|---|
| 5,930,136 A | 7/1999 | Nakajima et al. | 364/148.03 |
| 6,085,183 A | 7/2000 | Horn | |
| 6,807,449 B1 | 10/2004 | Schlang et al. | 700/48 |
| 7,882,049 B2 | 2/2011 | Collette | |
| 9,547,290 B2 | 1/2017 | Dagner | |
| 2008/0306890 A1* | 12/2008 | Eguchi | G05B 13/0265 706/12 |
| 2010/0192660 A1 | 8/2010 | Kurz et al. | 72/365.2 |
| 2015/0241873 A1 | 8/2015 | Goldenberg et al. | |

FOREIGN PATENT DOCUMENTS

| | | |
|---|---|---|
| CN | 101203818 A | 6/2008 |
| CN | 103547384 A | 1/2014 |
| DE | 44 47 288 A1 | 7/1995 |
| DE | 195 47 010 A1 | 6/1996 |
| DE | 197 31 980 A1 | 1/1999 |
| DE | 10 2007 035 283 A1 | 1/2009 |
| DE | 10 2008 028 777 A1 | 12/2009 |
| JP | H04-231106 A | 8/1992 |
| JP | H05-318222 A | 12/1993 |

OTHER PUBLICATIONS

Written Opinion dated Apr. 18, 2018 in corresponding PCT International Application No. PCT/EP2017/071827.
Partial European Search Report dated Apr. 13, 2017 in corresponding European Patent Application No. 16188584.3.
European Search Report dated Aug. 31, 2017 in corresponding European Patent Application No. 16188584.3.
Y. LeCun et al., "Deep Learning," Nature, vol. 521, pp. 436-444, May 28, 2015.
Chinese Office Action, dated Jun. 29, 2021, issued in corresponding Chinese Patent Application No. 201780056211.9. English translation. Total 13 pages.

* cited by examiner

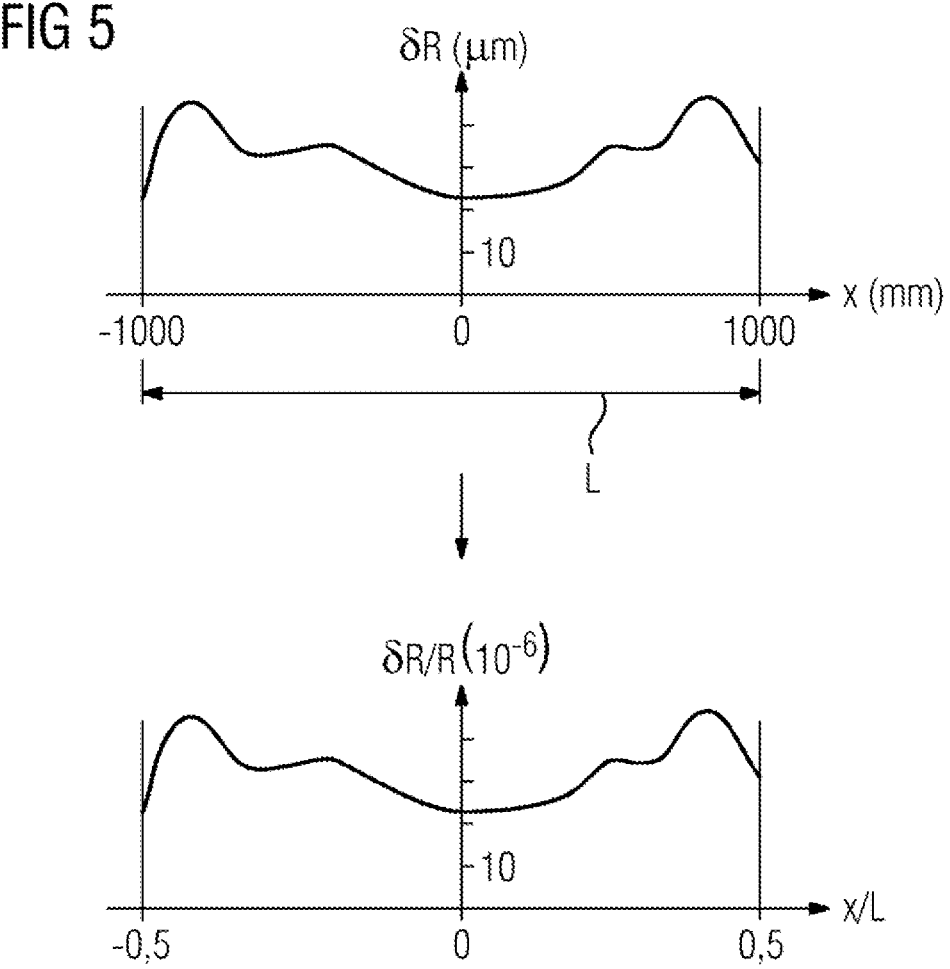
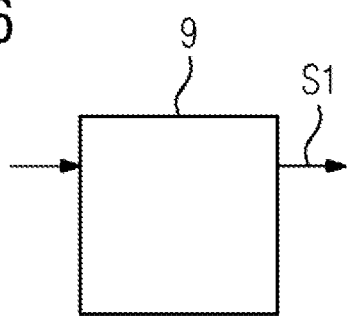

USE OF COMPREHENSIVE ARTIFICIAL INTELLIGENCE IN PRIMARY INDUSTRY PLANTS

CROSS-REFERENCE TO RELATED APPLICATIONS

The present application is a 35 U.S.C. §§ 371 national phase conversion of PCT/EP2017/071827, filed Aug. 31, 2017, which claims priority of European Patent Application No. 16188584.3, filed Sep. 13, 2016, the contents of which are incorporated by reference herein. The PCT International Application was published in the German language.

FIELD OF INVENTION

The disclosed invention relates to the use of comprehensive artificial intelligence in primary industry plants.

SUMMARY OF THE INVENTION

The present invention is based on a method of operation for a primary industry plant,
wherein an automation system ascertains control data and outputs the control data to controlled elements of the plant and controls and/or monitors the plant thereby,
wherein sensor devices capture measurement data into the plant,
wherein the automation system accepts at least some of the measurement data and takes the accepted measurement data into consideration when ascertaining the control data,
wherein a human-machine interface outputs measurement data of the sensor devices and/or data of the automation system and/or planning data of a production planning system to a person and/or accepts control commands from the person and forwards the control commands to the automation system,
wherein the automation system takes the forwarded control commands into consideration when ascertaining the control data,
wherein an artificial intelligence accepts at least some of the measurement data of the plant from the sensor devices and the control data and/or internal data of the automation system from the automation system and the data output to the person from the human-machine interface and accepts the control commands from the human-machine interface or the automation system,
wherein the artificial intelligence uses the accepted data and commands to ascertain evaluation results and makes the evaluation results available to the person via the human-machine interface and/or an independent output device and/or makes them available to the production planning system for the primary industry plant and/or prescribes them to the automation system directly or via the human-machine interface in the form of control commands,
wherein at least some of the data accepted by the artificial intelligence are dimensional data.

Dimensional data in the context of the present invention are data of the same kind that are sequentially successive in at least one dimension. The dimension can be a local dimension. In this case, the dimensional data form, for example, a local distribution, for example, a temperature distribution. The distribution can be one-dimensional, two-dimensional or three-dimensional. A Fourier transform of the location can also be understood as a dimension. Alternatively, the dimension can be a temporal dimension. In this case, the dimensional data form, for example, a time characteristic, for example, a temperature characteristic. A Fourier transform of the time can also be understood as a dimension. An example is a frequency spectrum. Furthermore, a combination of (at least) a local dimension with a temporal dimension is also possible, that is to say, for example, the time characteristic of a local distribution.

Temperature is mentioned above only by way of example. Instead of temperature, other variables can also be used, for example, a pressure or tension characteristic and/or an appropriate distribution. A crowning characteristic over the strip width or the length of the roller barrel of a roller in a roller stand—if need be additionally as a time characteristic—is also possible. Similarly, other variables can be used.

The present invention is furthermore based on a computer program that comprises non-transitory machine code residing on a computer-readable medium and executable by a computing device, wherein the execution of the machine code by the computing device causes the computing device to implement an artificial intelligence that
accepts at least some of the measurement data, which are captured by sensor devices of a primary industry plant during operation of the primary industry plant, control data and/or internal data, which are ascertained by an automation system controlling and/or monitoring the primary industry plant and, in the case of the control data for controlling the primary industry plant, are output to controlled elements of the primary industry plant, and data output to a person by a human-machine interface of the primary industry plant,
accepts control commands forwarded by the human-machine interface or the automation system of the human-machine interface to the automation system,
uses the accepted data and commands to ascertain evaluation results and makes the evaluation results available to the person via the human-machine interface and/or an independent output device and/or makes them available to a production planning system for the primary industry plant and/or prescribes control commands to the automation system directly or via the human-machine interface,
wherein at least some of the data accepted by the artificial intelligence are dimensional data.

The present invention is furthermore based on a computing device, wherein the computing device is programmed with a computer program as set forth herein and, for the purpose of transmitting information, is connected at least to an automation system, sensor devices and a human-machine interface of a primary industry plant.

The present invention is furthermore based on a primary industry plant,
wherein the plant has an automation system that ascertains control data and outputs the control data to controlled elements of the plant and controls and/or monitors the plant thereby,
wherein the plant has sensor devices that capture measurement data of the plant,
wherein the automation system accepts at least some of the measurement data and takes the accepted measurement data into consideration when ascertaining the control data,
wherein the plant has a human-machine interface that outputs measurement data of the sensor devices and/or data of the automation system to a person and/or accepts control commands from the person and forwards them to the automation system, wherein the automation system takes the forwarded control commands into consideration when ascertaining the control data, wherein the plant has a programmed computing device as set forth herein.

The primary industry plant can be—both in the prior art and in the case of the present invention—a steel industry plant or a metal-producing industry plant, for example. Examples of such plants are a plant for producing iron such as a blast furnace or a direct reduction plant, for example, a direct reduction plant of Finex type, Corex type or Midrex type, of rotary tube or rotary hearth type with or without a submerged arc furnace. Further plants are, for example, downstream devices in which steel is produced from pig iron. Examples of such plants are an arc furnace, a converter and plants in which pan processes take place such as a vacuum treatment plant. Further plants are devices downstream of the steelmaking in which primary forming of the metal and primary forming of the primary-formed metal take place. Examples of such plants are a continuous casting plant and rolling mills. The rolling mills can be, for example, a rolling mill for rolling a flat rolling material such as a roughing train, a finishing train, a Steckel mill and others. Furthermore, the rolling mills can be a rolling mill for rolling a different cross section, for example, a semi-finished steel product cross section. The rolling mill can alternatively be a rolling mill for hot rolling of metal, a rolling mill for cold rolling of metal or a combined rolling mill in which the metal is rolled first hot and then cold. A cooling section—if need be in combination with a rolling mill—can also be regarded as a steelmaking plant. Other plants upstream or downstream of a rolling mill are also possible, for example, an annealer or a pickler.

Primary industry plants have process automation as a rule. For the most part, the process automation comprises multiple levels. Level 0 is formed by the sensor and actuator systems. Level 1 is what is known as the base automation, which implements the control loops. Level 2 contains the technological automation, which comprises the process models and ascertains the setpoint values for the control loops. Other levels are also known, relating to the production planning, for example.

Although the operation of the primary industry plants is normally highly automated, it is not fully automated. In particular, a person always has the opportunity to intervene in the automatic control of the plant in particular situations, such as faults. The intervention takes place with the aim of maintaining safe plant operation and avoiding adverse effects on production, the productivity of the plant, and the product quality as much as possible. Since the interventions by the person are still required, a robust, automated process that can handle faults and deviations from regular operation is still not sufficiently developed to be able to ensure fully automatic operation.

To improve operation, it is a known practice to incorporate artificial intelligence, for example, in the form of a neural network, into the process automation. The artificial intelligence also contains the knowledge of the situation-dependent manual control interventions by the person. The automated control of the primary industry plant can be improved through the use of such artificial intelligence. This improvement does not yet lead to fully automatic operation either, however. Even today, control interventions by the operating personnel are therefore still required.

It has recently furthermore been found that, in many primary industry plants, the specialist knowledge and expertise is not, or is only inadequately stored and documented, and largely resides in the heads of the people. Documentation proves difficult in particular because the operators often react intuitively on the basis of their experience without ever consciously realising why they react in that way and not otherwise. Such often intuitive knowledge also cannot be learned by means of the artificial intelligence used hitherto.

The object of the present invention is to provide opportunities to be able to automate the operation of the primary industry plant not only in normal operating states but also in extraordinary operating states. The aim is ideally to be able to avoid any control intervention. The aim is at least to reduce the number of control interventions, however.

The object is achieved by a method of operation recited in the independent claim(s). Advantageous configurations of the method of operation are the subject of the dependent claims.

According to the invention, a method of operation of the type cited at the outset is configured by virtue of the dimensional data comprising an image output to the person via the human-machine interface, a temporal sequence of such images, a portion of such an image or a temporal sequence of such a portion. The image can be an optical or infrared image. The images can be in the form of pixel arrays, as 2D areas or as 3D volumes, for example. It is also possible to prescribe local or temporal curves. Alternatively or in addition, the dimensional data can comprise an acoustic vibration or a spectrum of such a vibration.

On the basis of the evaluation of such data, which in the prior art are usually perceived immediately by a person by means of his sensory organs and are accordingly also intellectually evaluated by the person, it is in particular also possible for complex substantive matter to be evaluated.

In one preferred configuration, there is provision for at least some of the dimensional data to extend in at least two dimensions—in particular in at least two local dimensions—and for the artificial intelligence to ascertain curves of equal value and/or gradients, in the case of temperatures for example isotherms or temperature gradients, when ascertaining the evaluation results for the dimensional data.

Additionally, the dimensional data can comprise data calculated by the automation system on the basis of a model. Examples of such data are a calculated temperature characteristic or a calculated temperature distribution of a metal strip in a finishing train or in a cooling section. If need be, it is additionally also possible for the phase of the metal strip to be taken into consideration. Other calculated data can also be used, for example, data that are not directly measurable but rather are calculated by means of what is known as a soft sensor.

Artificial intelligence—generally speaking—is a unit, implemented by a computing device, that to outsiders seems like human intelligence. Artificial intelligence comprises in particular machine learning, machine vision and detection of objects (computer vision), language processing and robotics. Machine learning is an artificial intelligence that, based on a large number of situations or characteristics along with associated rating (or a criterion for ascertaining the rating), is itself able to learn how it needs to behave to gain a highest possible rating. The rating can either be prescribed to the artificial intelligence or ascertained by the artificial intelligence independently on the basis of a rating criterion known to the artificial intelligence. The artificial intelligence therefore accumulates and contains the knowledge of optimum operation of the primary industry plant matched to the respective situation. Machine vision and detection of objects is in particular the extraction of objects in images and the assignment thereof to a general category. Objects in this context are two-dimensional elements that can be moved without influencing other elements. Language processing comprises in particular the independent recognition of words and, in the context of the present invention, also generally the analysis of acoustic vibrations.

It is possible for the artificial intelligence to be trained in advance. It is even possible for the artificial intelligence to be trained exclusively in advance and to remain unchanged for the method of operation. However, the present invention shows its full strength when the artificial intelligence, in parallel with the ascertainment of the evaluation results, ascertains a rating for the evaluation results and retrains itself on the basis of the rating. The reason is that this results in the data and commands accepted by the artificial intelligence gradually being evaluated better and better.

Data sources for the learning can be in particular the automation system, the sensor devices and the human-machine interface.

The data comprise—both for learning and during later operation—at least the dimensional data. Additionally, even singular data—that is to say individual values (as opposed to sequentially successive values)—can be used.

The artificial intelligence used can be determined as required and depending on the application. The type of artificial intelligence can be of different nature in this case. For example, the artificial intelligence can be in the form of an artificial neural network, a support vector machine, a decision tree, a Bayesian belief network, what are known as k-nearest neighbours, a self-organizing map, case-based reasoning, instance-based learning or what is known as a hidden Markov model. Combinations of such configurations are also possible.

In one preferred configuration of the present invention, the artificial intelligence is in the form of an artificial neural network, in particular a deep neural network or a convolutional neural network (DNN=deep neural network, CNN=convolutional neural network). With artificial intelligence of this kind, it is in particular possible for dimensional data such as image data or acoustic vibrations to be processed easily. It is also possible for the artificial intelligence to be configured to have multiple neural networks, wherein different network types are used, for example, at least a normal neural network having only one or two hidden layers of neurons and additionally at least a neural network of DNN or CNN type. In particular the latter neural networks are also suitable for trajectory control.

Neural networks are based on a system of nodes (neurons) that act on one another via different lines with weighting factors. The neurons are arranged in layers. A neural network has an input layer, an output layer and at least one hidden layer of neurons. Data enter the neural network via the input layer, and the output layer can be used to tap off the responses and results of the neural network. Knowledge is stored in the hidden layers. Learning takes place by virtue of changes in the weights with which the neurons act on one another. Such learning is often also referred to as training.

The terms "deep neural network" and "convolution neural network" have a well-defined meaning for a person skilled in the art in the field of computer technology. In particular, a deep neural network is a neural network in which at least three hidden layers of neurons are present. This is in contrast to a normal or flat neural network in which no more than two hidden layers are present. Often, even just a single hidden layer is present in a normal neural network. A deep neural network enables in particular the storage of complex contexts and thus the analysis of complex tasks. A convolutional neural network (CNN) is another very common special form of neural network. It is particularly suitable for the processing of dimensional data. A neural network of this kind consists of an input layer, multiple alternating convolutional and subsampling layers (hidden layers) and an output layer. The network is divided into the areas of input, feature extraction and classification. First, the input data are convoluted by means of a convolution layer. This results in the information from adjacent data points being forwarded in bundled fashion to the next layer. The corresponding data points of the input matrix are multiplied by the coefficients of a convolution kernel. A new data point is formed from the sum in the respective next layer. As a result, multiple parallel convolutions are obtained that produce a generalization. This results in multiple independent feature maps. A subsequent subsampling layer can compress the feature maps further, for example, halve them. Each subsequent convolutional layer can then contain further feature maps. The last convolution or subsampling layer is connected to the neurons of a classification layer fully, i.e. each neuron is connected to each feature map. The output layer delivers the result of the analysis. A convolutional neural network, in contrast to a normal neural network, results in the coefficients of the convolution kernels being determined instead of the weights of the connections between the neurons. An inherently known back propagation learning algorithm can be used for this, for example. A convolutional neural network is a special case of a deep neural network. It in particular exploits the circumstance that relevant correlations and thus connections often exist only between variables that are closely adjacent in location and/or time. Such structures are in particular advantageous to construct increasingly abstract, localized depictions of an image. Neural networks of this kind are advantageous in particular for the processing of dimensional input data—as explained above. A description of a convolutional neural network can be found in the technical paper 'Deep learning' by Yann LeCun et al., for example, published in Nature, volume 521, May 28, 2015, pages 436 to 444.

The advantage of such neural networks is the reduced time taken for the learning process. As a result, even very large neural networks that have, for example, 5, 8 or 10 hidden layers (or even more hidden layers) and a total of $10^4$ or $10^5$ neurons become trainable in a time that is reasonable in practice (usually just a few hours). This is made possible by the availability of software and hardware working in parallel, for example, in one or more GPUs (GPU=graphics processing unit), inter alia.

A further neural network well-suited to the implementation of the present invention is what is known as an RNN=recurrent neural network. A neural network of this kind is suitable in particular for data that are available as a chronological sequence.

It is also possible to combine different architectures, e.g. a CNN and an RNN.

The explanations below are provided generally for the data accepted by the artificial intelligence. It is possible that these explanations apply only to some of the data. However, they apply at least to some of the dimensional data.

Preferably, the data accepted by the artificial intelligence and/or the relationship of said data in the dimension are/is unitless or are/is converted into such data by the artificial intelligence. For example, dimensions in the strip width direction of a metal strip—preferably starting from the center of the metal strip—can be normalized to the width of the metal strip. Similar approaches are possible for other dimensions of the metal strip. It is also possible, for example, in the case of information relating to rollers in a roller stand, for the respective location—preferably starting from the barrel center—to be normalized to the barrel length of the respective roller. Locations within an image can be normalized to the overall dimensions of the respective image, for example. Again, the reference taken is preferably the center of the image. A grayscale of a pixel value can be normalized to a value between 0 and 1 (or alternatively between −0.5 and +0.5). In a similar way, a range of adjustment of an actuating element can also be normalized. Other normalizations are also possible. It is also possible to combine different variables to ascertain unitless variables. Examples are a normalization of chemical analyses, temperatures, heat transfers and currents.

This configuration provides a simple way of transferring the knowledge stored in the artificial intelligence for a specific primary industry plant to another, similar primary industry plant.

In one particular configuration, it is possible, by way of example, for a) the data accepted by the artificial intelligence to comprise at least an image, on the basis of which the lateral position of a metal strip between two roller stands in a multi-stand rolling train is ascertainable, and a difference manipulated variable of the upstream instance of the two roller stands, and b) the evaluation results ascertained by the artificial intelligence to comprise a strategy for controlling the strip transit. In particular, control of the lateral position is often difficult in the prior art and is often still effected manually. This can be remedied by the present invention.

In a further configuration, it is possible, by way of example, for a) the data accepted by the artificial intelligence to comprise dimensional data describing a wear on a structural element of the primary industry plant, and b) the evaluation results ascertained by the artificial intelligence to comprise a prediction of a remaining operating time of the structural element of the primary industry plant. The structural element can be a working roller in a roller stand, for example. In this case, the data accepted by the artificial intelligence comprise a roller barrel contour as a function of the roller travel of the working roller, and the pass schedule data of the roller stand. On the basis of these data, the artificial intelligence can predict when the respective working roller (normally together with the other working roller in the relevant roller stand, that is to say as a set of working rollers) needs to be changed. This prediction can be used for adapting and optimizing production planning, for example.

In a further configuration, it is possible, by way of example, for the data accepted by the artificial intelligence to comprise
- at least a mass flow and/or at least a volume flow of a substance supplied to a converter vessel as a function of time,
- a position of a lance in the converter vessel as a function of time,
- a cooling water temperature of the converter vessel as a function of time,
- an amount and/or a composition of an exhaust gas emerging from the converter vessel as a function of time,
- at least one acoustic vibration and/or the spectrum thereof originating from the area of the converter vessel,
- at least one image containing the area of a converter hood (visible spectrum or infrared),
- dimensional model data from a physico-chemical model of a metal in the converter vessel and/or previously determined comparison data corresponding thereto and/or
- a spatially resolved representation of a converter lining condition.

The evaluation results ascertained by the artificial intelligence may comprise a prediction of a probability, a time, a level of expected discharge (slopping) from the converter vessel, an expected final oxygen and/or carbon content of the metal in the converter vessel, a temperature of the metal in the converter vessel that is forecast for a tapping time, a result of a dephosphorization process in the converter vessel and/or metallurgical variables during a blowing process inside the converter vessel.

In practice, it ought presumably to be advantageous to preprocess the dimensional data supplied to the artificial intelligence in a preprocessing device before they are supplied to the artificial intelligence. Furthermore, it ought—as an alternative or in addition to the preprocessing—to be advantageous to initially evaluate the evaluation results ascertained by the artificial intelligence in an evaluation device and/or to evaluate the evaluation results by means of an optimization device for the purposes of an optimization and only then to make them available to the person and/or to the production planning system and/or to prescribe them to the automation system.

According to the invention, in a computer program as disclosed herein the dimensional data comprise an image output to the person via the human-machine interface, a temporal sequence of such images, a portion of such an image or a temporal sequence of such a portion. The image can be an optical or infrared image. The images can be in the form of pixel arrays, as 2D areas or as 3D volumes, for example. It is also possible to prescribe local or temporal curves. Alternatively or in addition, the dimensional data can comprise an acoustic vibration or a spectrum of such a vibration.

In the preferred configuration of the computer program, the execution of the machine code by the computing device causes the artificial intelligence implemented by the computing device to implement the advantageous configurations of the method of operation that are explained above.

The object is furthermore achieved by a computing device programmed with a computer program to perform a method according to the invention. The computing device can alternatively be a single computer or a group of computers. The computers can comprise CPUs or GPUs. They can—alternatively or additionally—also comprise particular application-specific circuits, for example, FPGAs (=field programmable gate array). Even (alternative or additional) use of a TPU (=tensor processing unit) or multiple TPUs is possible.

Usually, the computer device will be in the area of the primary industry plant and firmly associated with the plant. It is, however, also conceivable for the computing device to be arranged completely or partially at a remote location, for example, with a manufacturer of the primary industry plant or "somewhere" in a cloud.

The object is furthermore achieved by a primary industry plant having a computing device according to the invention.

Figure 2:
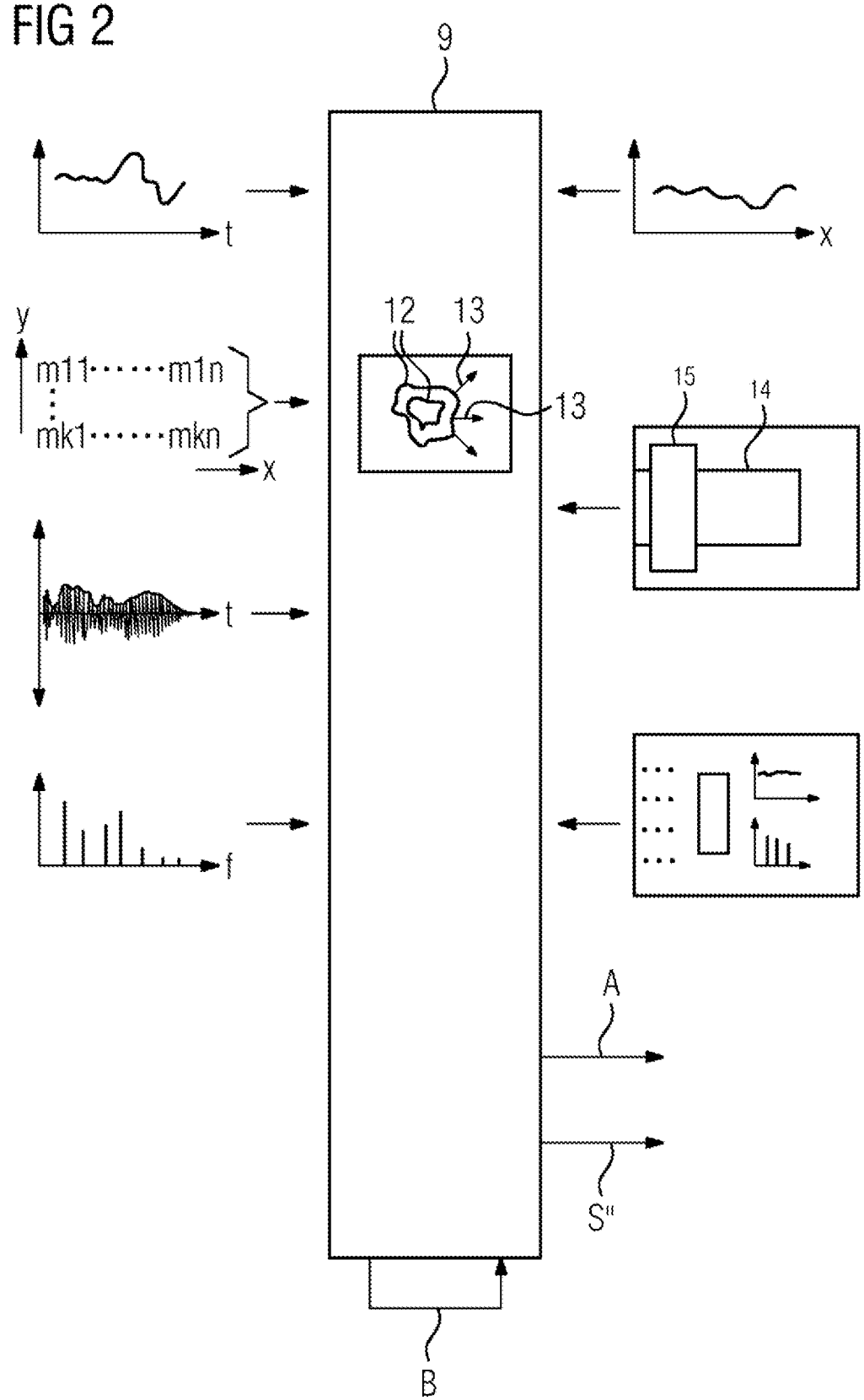
Figure 3:
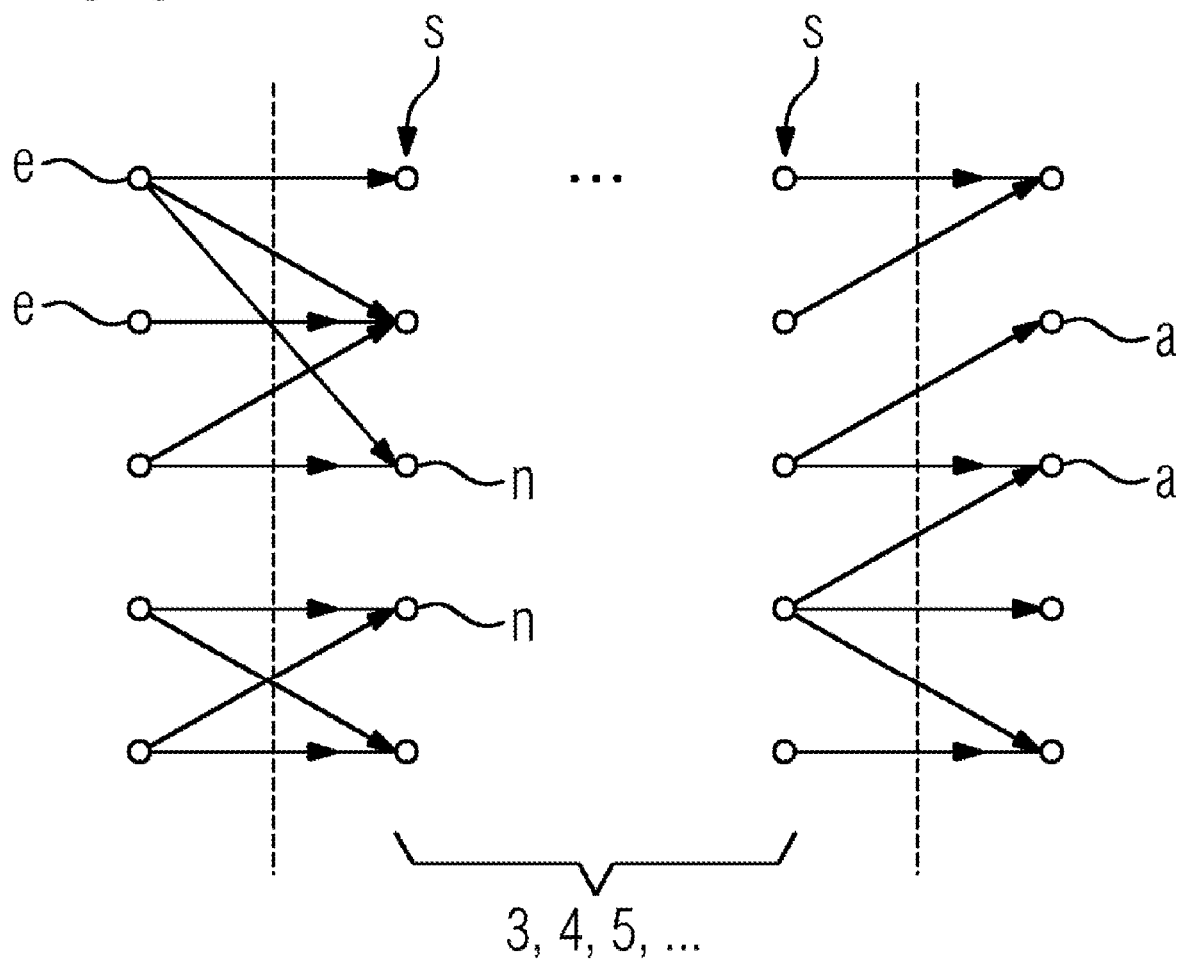
Figure 4:
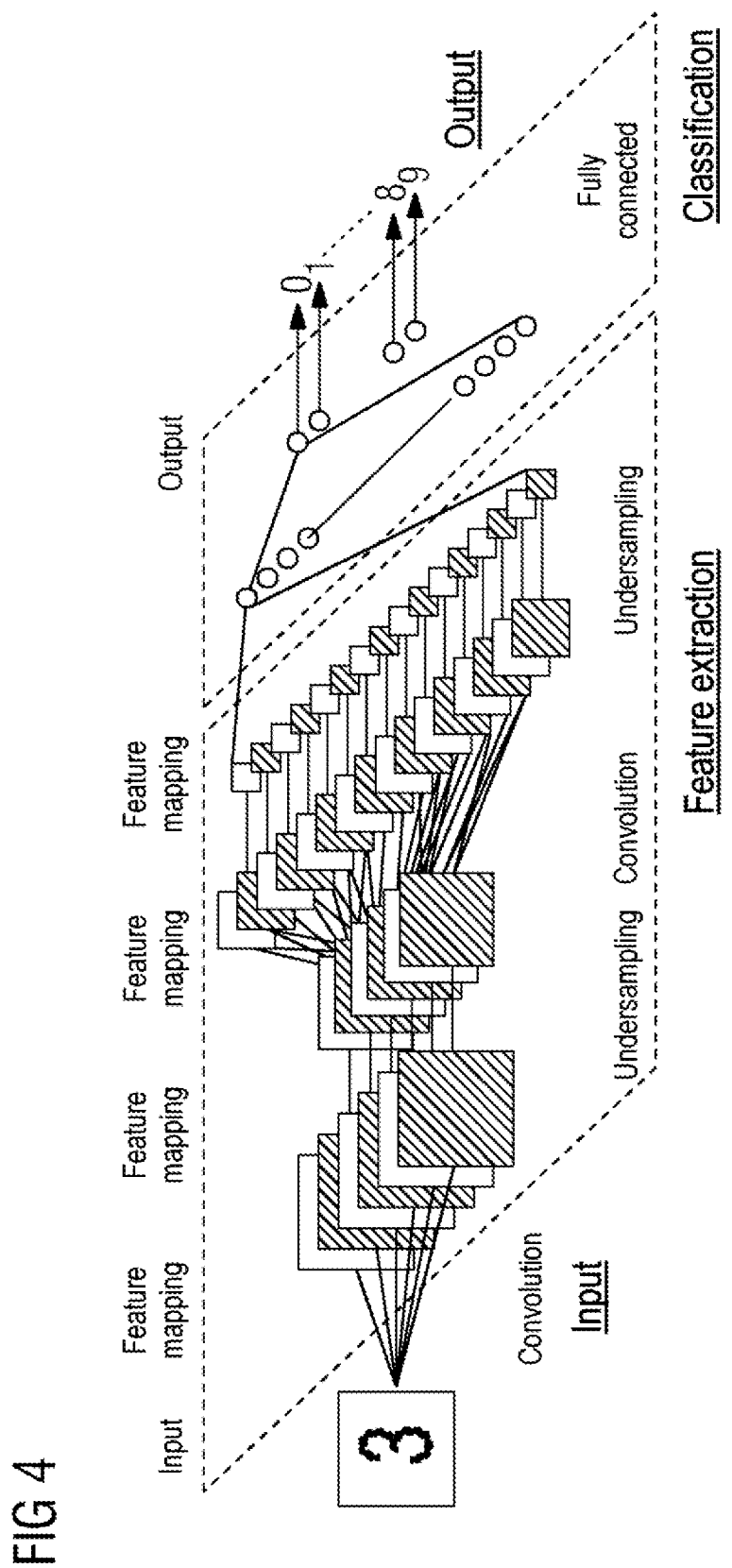
Figure 9:
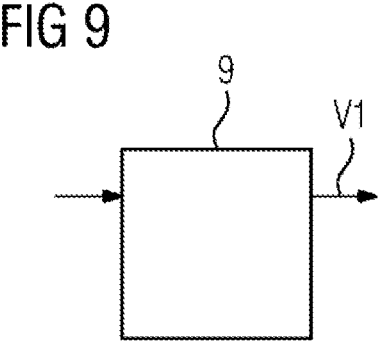
Figure 10:
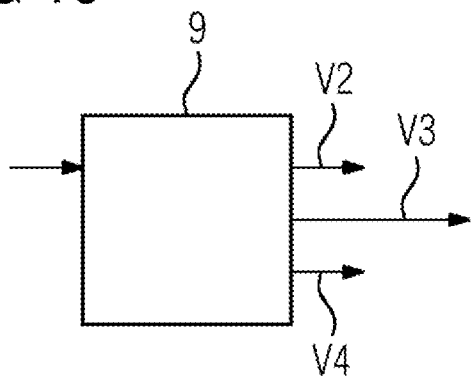
Figure 11:
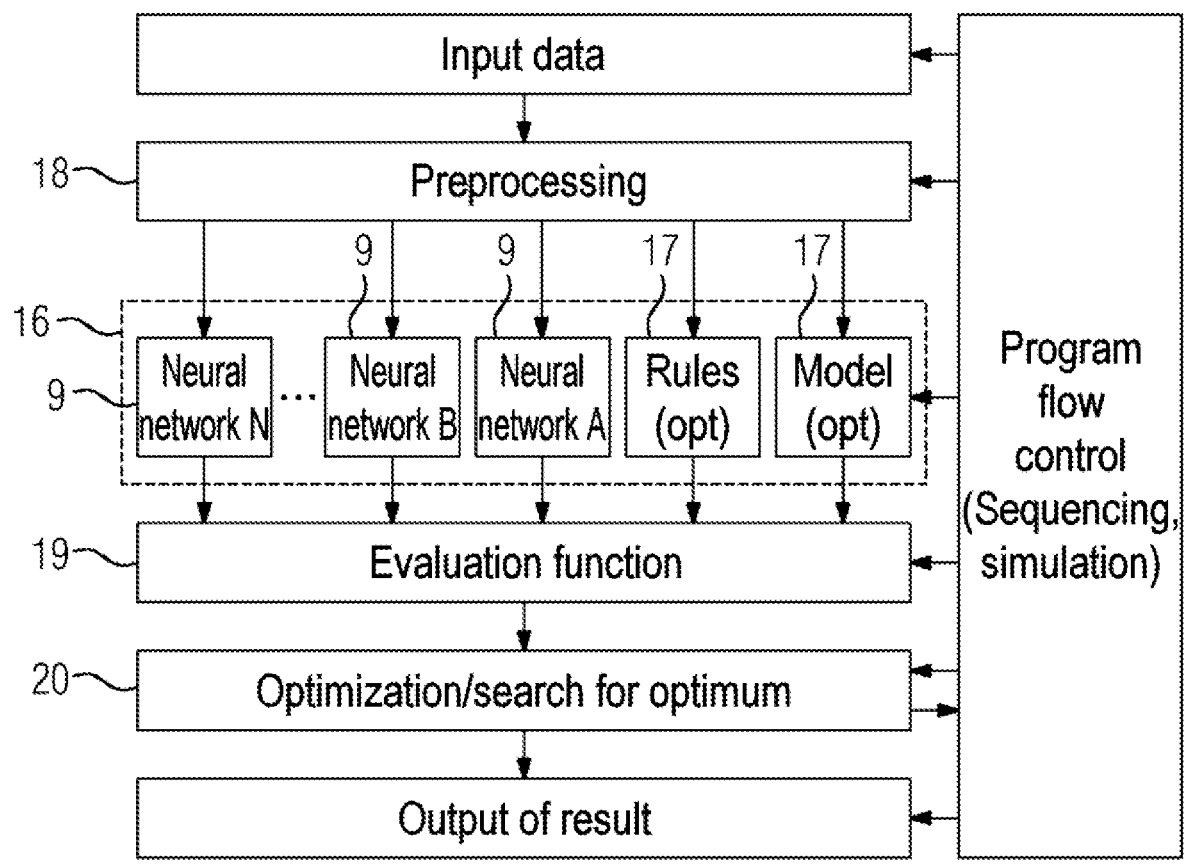

The characteristics, features and advantages of this invention that are described above and the manner in which they are achieved will become clearer and more distinctly comprehensible in connection with the description of the exemplary embodiments that follows, said exemplary embodiments being explained in more detail in conjunction with the drawings, in which, in a schematic depiction:

FIG. 1 shows the structural design of a primary industry plant,

FIG. 2 shows an artificial intelligence and possible input data supplied to the artificial intelligence, FIG. 3 shows a possible configuration of an artificial intelligence, FIG. 4 shows a further possible configuration of an artificial intelligence, FIG. 5 shows an example of a conversion of variables having units into unitless variables, FIGS. 6 to 10 show possible specific applications of the artificial intelligence, and FIG. 11 shows an incorporation of an artificial intelligence into a general data processing concept.

According to FIG. 1, a—in principle any—primary industry plant ANL has an automation system 1, sensor devices 2 and a human-machine interface 3. The automation system 1 can in this case also include, among other things, a PDA system (PDA=process data acquisition). A PDA system stores captured process data for a history, so that even afterwards it is still possible to access process data that have arisen earlier. As a result, the underlying cause can be ascertained in particular in the course of troubleshooting, for example. Further, this means that the previous time characteristics of all process variables are also available.

The sensor devices 2 capture measurement data M of the plant ANL. The measurement data M can be single values such as a singular temperature or a singular speed or a singular force. Alternatively, they can be dimensional data such as a temperature time characteristic or a local temperature distribution. Other variables are also possible. At least some of the measurement data M captured by means of the sensor devices 2 are supplied to the automation system 1, which accepts the measurement data M supplied to it. At least some of the measurement data M captured by means of the sensor devices 2 are furthermore transmitted to the human-machine interface 3. The human-machine interface 3 outputs the measurement data M transmitted to it to a person 4. The person 4 can be an operator of the primary industry plant ANL, a fitter, a commissioning engineer or other person or can belong to the maintenance personnel, for example.

It is possible for all measurement data M captured by the sensor devices 2 to be supplied both to the automation system 1 and to the human-machine interface 3. Normally, however, only some of the measurement data M captured by the sensor devices 2 are supplied both to the automation system 1 and to the human-machine interface 3. Normally, other measurement data M captured by the sensor devices 3 are supplied exclusively to the automation system 1, but not to the human-machine interface 3 also. The opposite can apply to yet other measurement data M captured by the sensor devices 2.

The human-machine interface 3 continues to accept data D from the automation system 1 and outputs them to the person 4. Furthermore, the human-machine interface 3 accepts control commands S from the person 4. The accepted control commands S are forwarded by the human-machine interface 3 to the automation system 1.

The automation system 1 uses the information available to it to ascertain control data S'. The control data S' are output by the automation system 1 to controlled elements 5 of the plant ANL. As a result, the plant ANL is controlled and/or monitored by the automation system 1. When ascertaining the control data S', the automation system 1 takes into consideration both the accepted measurement data M and the control commands S forwarded by the human-machine interface 3. The automation system 1 often also takes into consideration internal data I, i.e. data available only within the automation system 1, when ascertaining the control data S'. These internal data I are neither accepted from the outside nor delivered to the outside by the automation system 1 (during the control process as such). By way of example, they can be data that are ascertained by the automation system 1 with the assistance of a model. They can also be data that are merely calculated alongside by the automation system 1 without model formation, for example values from timers or flags. The information that the automation system 1 uses to ascertain the control data S' can comprise planning data P transmitted to the automation system by a production planning system 11, for example.

The plant ANL furthermore has a computing device 6. The computing device 6 is connected to the automation system 1, the sensor devices 2 and the human-machine interface 3 for the purpose of transmitting information. The computing device 6 is programmed with a computer program 7. The computer program 7 comprises machine code 8 executable by the computing device 6. The execution of the machine code 8 by the computing device 6 causes the computing device 6 to implement an artificial intelligence 9. According to the explanations below, the artificial intelligence 9 is in the form of a neural network. The artificial intelligence could, however, also be in the form of a support vector machine, a decision tree, a Bayesian belief network, a self-organizing map, case-based reasoning, instance-based learning, what is known as a hidden Markov model or what are known as k-nearest neighbors.

The artificial intelligence 9 operates as follows:
The artificial intelligence 9—at least partially—accepts:
from the sensor devices 2 the measurement data M of the plant ANL,
from the automation system 1 the control data S' and/or the internal data I and
from the human-machine interface 3 the data output to the person 4.

The artificial intelligence 9 continues to accept the control commands S from the human-machine interface 3 or the automation system 1.

Using the accepted data M, S', I and commands S, the artificial intelligence 9 ascertains evaluation results A. The evaluation results A are output by the artificial intelligence 9. For example, the artificial intelligence 9 can make the evaluation results A available to the person 4 via the human-machine interface 3 and/or an independent output device 10. The independent output device 10 can be in the form of a smartphone or the like, for example. Alternatively or additionally, the artificial intelligence 9 can make the evaluation results A available to the production planning system 11. For example, the evaluation results A of the artificial intelligence 9 can be the reproduction of digitally stored knowledge. Digitally stored knowledge is understood to mean specialist knowledge built up by operators 4 over many years but not previously documented, that is to say which (to date) is only in the heads of the operators 4. It can also be knowledge learned from use and/or operation of the primary industry plant ANL and then stored. This knowledge can be made available to the person 4 on request. The request as such can be in text form. However, it should be supplemented by other data M, I accepted by the artificial intelligence 9. Alternatively, the artificial intelligence 9 can prescribe the evaluation results A to the automation system 1 in the form of control commands S". It is possible for the control commands S" to be prescribed directly. Alternatively, the control commands S" can be prescribed via the human-machine interface 3. In the latter case, it is in particular possible for the control commands S" to be initially offered to the person 4 and then put into effect or supplied to the automation system 1 if, and only if, the person 4 unlocks the control commands S" by means of a confirmation command C.

It is possible for the artificial intelligence 9 to output the evaluation results A only at the specific request of the person 4. Alternatively, it is possible for the artificial intelligence 9, while normally outputting no evaluation results A, to constantly and automatically check whether it detects or forecasts a less than optimum or even critical plant condition on the basis of the data supplied to it. In this case, the artificial intelligence 9 can output the evaluation results A, together with an alarm or advice, to the person 4 in the event of the detection of such a plant condition. The evaluation results A can as well also comprise a proposal as to how the detected less than optimum or even critical plant condition can be countered, for example.

The artificial intelligence 9 can therefore implement—depending on its design and incorporation—an "artificial helmsman". The "artificial helmsman" can directly or indirectly act on the automation system 1 via the human-machine interface 3. The artificial intelligence 9 can also act as a "digital assistant" to the (human) helmsman that points out less than optimum/critical plant conditions to the helmsman and/or suggests control commands S" to the helmsman that the helmsman then only needs to implement or possibly even just to confirm. The artificial intelligence 9 can also act as a "digital expert" for the (human) helmsman that provides the helmsman with its knowledge on request.

At least some of the data M, S', I accepted by the artificial intelligence 9 are dimensional data. This is explained in more detail below in conjunction with FIG. 2 on the basis of several examples.

As depicted at the very top left in FIG. 2, the dimensional data can comprise a time characteristic of a measured value or of an internal value, for example. In this case, the applicable data are one-dimensional and the dimension is time. An example is a temperature characteristic. The temperature characteristic can be measured or can be ascertained computationally. It is possible to prescribe the applicable time characteristic to the artificial intelligence 9 as a pure sequence of values. In this case, the artificial intelligence 9 needs to know the time base. It is furthermore possible to prescribe the applicable time characteristic to the artificial intelligence 9 as a sequence of pairs of values, with one of the two values in each pair of values being the respective time and the other value being the respective measured value M. It is even possible to prescribe the applicable time characteristic to the artificial intelligence 9 as an image that the artificial intelligence 9 uses to ascertain the time characteristic. This will become apparent from the explanations below.

As depicted directly below that in FIG. 2, the dimensional data can also extend in at least two dimensions. Purely by way of example, this is shown in the depiction for a data field extending in two local dimensions. An example of such a data field is the surface temperature of a metal strip spatially resolved into strip width direction and strip length direction.

In the case of such a data field extending in at least two dimensions, the artificial intelligence 9 can ascertain in particular curves of equal value 12 (in the case of a temperature field that is to say isotherms) or gradients 13 when ascertaining the evaluation results A for such data. As is apparent from the depiction in FIG. 2 inside the artificial intelligence 9, it is also possible to ascertain both the curves of equal value 12 and the gradients 13.

As depicted below that in FIG. 2, the dimensional data can comprise an acoustic vibration (that is to say the time characteristic of the noise level or the like). As an alternative to the time characteristic, the dimensional data, as depicted below that in FIG. 2, can comprise a spectrum of an acoustic vibration of this kind.

As depicted at the very top right in FIG. 2, the dimensional data can also comprise a local characteristic of a measured value or of an internal value. In this case, the applicable data are one-dimensional, the dimension being the location, however. One example is a contour characteristic of a roller gap. The contour characteristic will normally be ascertained computationally.

As depicted immediately below that on the right in FIG. 2, the dimensional data can comprise an image captured by a sensor device 2 (or a portion of such an image), for example. As can be seen from the repeated depiction of the image, the dimensional data can also comprise a temporal sequence of such an image or of such a portion of an image. An example of such an image is an image that shows a metal strip between two roller stands in a multi-stand rolling train. In particular an infrared image is advantageous in this case. However, it can also be an image in the visible spectrum.

As depicted below that on the right in FIG. 2, the dimensional data can comprise for example an image (or a portion of such an image) output to the person 4 via the human-machine interface 3. Again, the evaluation of a sequence of such an image or such a portion of an image is possible again.

Furthermore, the artificial intelligence 9 can also be supplied with further data, for example data of a chemical analysis. The chemical analysis can be on feedstocks (what chemical composition does the steel supplied to a converter have, for example?), production results (what chemical composition does the steel have after a ladle process, for example?) or byproducts (what chemical composition does an exhaust gas produced have, for example?), for example.

The evaluation of other dimensional data is also possible. Furthermore, the dimensional data can comprise not only measured data M but also data calculated by the automation system 1 on the basis of a model. An example of such data is a temperature characteristic over the thickness inside a metal strip.

As a general rule, the dimensional data comprise at least an image (be it an image captured by a sensor device 2 or an image output via the human-machine interface 3), a portion of such an image, a temporal sequence of such images or a temporal sequence of a portion of such images or an acoustic vibration or a spectrum of an acoustic vibration. In particular the evaluation of dimensional data of this kind, which have hitherto normally been supplied to a person, significantly increases the potential range of application of the present invention. The other dimensional data can be added as required.

It is conceivable for the artificial intelligence 9 to be supplied exclusively with dimensional data of this kind. Normally, however, the artificial intelligence 9 is additionally also supplied with other, non-dimensional data. In this case, the artificial intelligence 9 naturally also evaluates these data as well. The explanations below always relate to facts that either exclusively concern the dimensional data or else also concern the dimensional data in addition to non-dimensional data, however.

The artificial intelligence 9 is preferably capable of carrying out machine learning. The artificial intelligence 9 is therefore preferably a (suitably programmed) computing device 6 to which a respective fact and a rating B of the respective fact merely need to be prescribed sufficiently often and that can independently ascertain rules from the multiplicity of prescribed facts, along with the associated rating B, regarding how the best rating possible can be attained. Machine learning is thus a method for learning from example data. This approach is often also referred to in specialist circles as "programming by input-output examples rather than by coding". Artificial intelligences 9 of this kind are known generally to those skilled in the art. As soon as an artificial intelligence 9 of this kind has learned its expertise, it can also continue to learn always. This merely requires the artificial intelligence 9 to also ascertain the applicable rating B of the evaluation results A in parallel with the ascertainment of the evaluation results A. As a result, the artificial intelligence 9 can retrain itself on the basis of the rating B ascertained by it. In principle, the artificial intelligence 9 can also be in another form, however.

Various opportunities are provided for the implementation of the artificial intelligence 9. At present, according to the depiction in FIGS. 3 and 4, it is preferred for the artificial intelligence 9 to be in the form of an artificial neural network. The artificial neural network can in particular be a deep neural network, according to the depiction in FIG. 3, or even a convolutional neural network, according to the depiction in FIG. 4.

A neural network has, according to the depiction in FIGS. 3 and 4, a number of input neurons e and a number of output neurons a. There is at least one layer s of hidden neurons n between the input neurons e and the output neurons a. The neurons e, n, a are linked together in a manner known per se. Of the neurons e, n, a, only some are provided with their reference signs in FIGS. 3 and 4. A deep neural network is, according to the depiction in FIG. 3, a neural network that has a multiplicity of layers s of hidden neurons n. The number of layers s having hidden neurons n is at least three. It can also be larger, for example 5, 8 or 10. Usually, 15 layers s are entirely sufficient. The number of layers s having hidden neurons n is therefore preferably between these two limits, that is to say between 3 and 15. In individual cases, however, it is also possible for a neural network having more than 15 layers s of hidden neurons n to be used. A convolutional neural network is, according to the depiction in FIG. 4, a deep neural network that has an input layer (Input), multiple alternating convolutional and subsampling layers (hidden layers) and an output layer (output or classification). The convolutional and subsampling layers are the actual intelligence in the narrower sense, which extracts the relevant facts from the information provided via the input layer. The output layer delivers the result of the analysis. Appropriate matching of the convolutional neural network to the particular application allows the complexity of the neural network to be distinctly decreased in comparison with a deep neural network without decreasing the performance of the neural network for the particular application. The specific depiction in FIG. 4 serves to identify what number is depicted in an image on the basis of the image. The principle of FIG. 4 can also be applied to other facts given appropriate configuration of the convolutional neural network, however.

It is possible for the artificial intelligence 9 to accept and evaluate variables having units. Variables having units are variables that have an associated physical unit, for example the unit meters, the unit meters per second, newton, newton/$mm^2$ and others. Preferably, the data accepted by the artificial intelligence 9 and/or the relationship of said data in the dimension are/is unitless, however, or are/is converted into such data by the artificial intelligence 9. This process is explained in more detail on the basis of FIG. 5.

FIG. 5 shows, as an example of a dimensional variable, a locally one-dimensional variable, namely a contour characteristic of a working roller in a roller stand over the barrel length L. As the barrel length L, it is—in principle arbitrarily—assumed that it is exactly 2.00 m. In the upper portion of FIG. 5, the location on the roller barrel is plotted to the right and the crowning, i.e. the deviation 5R from a base radius R, is plotted upward. This type of depiction is not unitless. This is because both the location on the roller barrel as such and the crowning have the unit meters (m). However, it is a simple matter to convert both the location on the roller barrel as such and the crowning 5R into unitless variables. In particular, this merely requires, as shown in the lower depiction in FIG. 5, the crowning 5R to be related to the base radius R and the location on the roller barrel to be related to the barrel length L.

Similar approaches are possible for almost any other variables.

Several options for the implementation of the present invention are explained below in conjunction with FIGS. 6 to 10 on the basis of specific examples. However, the examples are not intended to be understood to mean that the present invention can be used only for these applications.

As shown in FIG. 6, the data accepted by the artificial intelligence 9 comprise, among other things,
  a cross section of a flat rolling material prior to execution of a plurality of rolling passes by means of which a flat rolling material is rolled in succession,
  for the plurality of rolling passes, the respective pass schedule data and the respective contour of the roller gap and/or the roller barrels of the working rollers in the roller stand executing the respective rolling pass, and
  cross section and/or flatness of the flat rolling material after execution of the plurality of rolling passes.

The rolling material can alternatively be a thick plate or a strip. The number of rolling passes is normally between 3 and 20, for example between 4 and 7, in particular 5, 6 or 7. Normally, the passes are executed in a multi-stand finishing train. In this case—the rule—, each rolling pass is executed by a separate roller stand. However, it is alternatively also possible for the rolling passes to be executed reversibly. In this case, the reversing stand (or in specific cases a pair of reversing stands) executes the passes. In this case, one roller stand thus executes multiple rolling passes.

For each pass, the artificial intelligence 9 has the contour of the roller gap and/or the roller barrels of the working rollers in the roller stand executing the respective rolling pass prescribed to it in spatially resolved fashion over the rolling material width. The spatial resolution is such that, when viewed over the rolling material width, the roller gap or the respective radius (or diameter) of the two working rollers over the rolling material width is prescribed for at least 5 points. Preferably, it is prescribed for at least 10 points. In the simplest case, the prescribed value is static. However, it can be defined as a function of time. In the latter case, it is in particular possible for the respective contour or the respective roller barrels to be associated with particular points on the rolling material that has finished being rolled by means of tracking of the rolling material.

For each pass, the artificial intelligence 9 continues to be supplied with the pass schedule data. The pass schedule data comprise in particular the respective setpoint roller gap, the respective rolling force, possibly the respective bend-back force, possibly a respective wedge setting and a respective working roller movement. Furthermore, the pass schedule data comprise the static and dynamic data of the rolling material. The static data of the rolling material comprise at least the chemical composition thereof, possibly also the width thereof. The dynamic data comprise (spatially resolved and/or temporally resolved in up to 3 dimensions) the temperature of the rolling material during the execution of the respective rolling pass and the thickness of the rolling material before and after the respective rolling pass and possibly additionally the width of rolling material before and after the respective rolling pass.

Furthermore, the artificial intelligence 9 has the initial cross section of the rolling material—that is to say before execution of the rolling passes—prescribed to it. The initial cross section is spatially resolved at least over the width. It can additionally also be spatially resolved over the length of the rolling material. The resolution over the width of the rolling material is such that, when viewed over the rolling material width, the respective thickness of the rolling material is prescribed for at least 5 points. Preferably, it is prescribed for at least 10 points. When viewed over the length of the rolling material, either no spatial resolution or at least spatial resolution for the head, the middle section and the foot of the rolling material is effected. It is still possible, in particular in the case of a strip, to perform spatial resolution, when viewed over the length of the rolling material, over many (often over 100) sections. The individual sections can be determined in this case by a standard length, a standard mass or an operating cycle, for example. The initial cross section of the rolling material can be prescribed to the artificial intelligence 9 in particular by an image that is displayed to the operator 4 via the human-machine interface 3.

Furthermore, the artificial intelligence 9 has the flatness and/or the cross section of the rolling material that has finished being rolled (that is to say after execution of the rolling passes) prescribed to it in spatially resolved fashion at least over the width of the rolling material, preferably also over the length of the rolling material. In respect of the accuracy of the spatial resolution in terms of length and width, the above statements regarding the initial cross section of the rolling material apply analogously. The flatness and cross section of the rolling material that has finished being rolled can also be prescribed to the artificial intelligence 9—analogously to the initial cross section of the rolling material—by applicable images that are displayed to the operator 4 via the human-machine interface 3.

The evaluation results A ascertained by the artificial intelligence 9 can in this case comprise for example a strategy S1 for moving the working rollers and/or intermediate rollers of the roller stands executing the respective rolling passes for a subsequent rolling process for another flat rolling material. The ascertained movements can then be used for the next rolling process—possibly for the next similar rolling process. In the simplest case, the movement is ascertained separately for each rolling pass. However, it is likewise possible to ascertain the movements across rolling passes. It can furthermore suffice in specific cases to ascertain the roller movement only for some of the roller stands or rolling passes.

This approach allows in particular contour characteristics and flatness characteristics of rolled metal strips to be optimized. It is sometimes additionally possible for roller change intervals to be maximized. The approach from FIG. 6 can be applied in particular for hot rolling of steel or aluminum.

Figure 7:
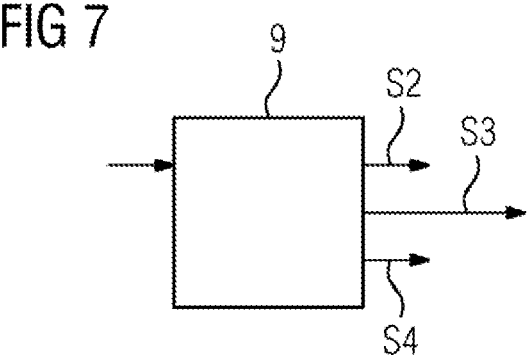

As shown in FIG. 7, the data accepted by the artificial intelligence 9 for a plurality of roller stands by means of which a flat rolling material is rolled in succession comprise the respective pass schedule data.

The rolling material is normally a strip. The strip is normally rolled in a tandem train in which the strip is cold rolled. The number of rolling passes is normally between 3 and 8, for example between 4 and 7, in particular 5 or 6. The pass schedule data comprise, in particular for each rolling pass, the respective setpoint roller gap, the respective rolling force, possibly a respective bend-back force, possibly a wedge setting and possibly a working roller movement. They furthermore comprise static and dynamic data of the rolling material for each rolling pass. The static data of the rolling material can comprise the chemical composition thereof and possibly also the width thereof, for example. The dynamic data comprise in particular the thickness of the rolling material before and after the respective rolling pass and possibly additionally the width of the rolling material before and after the respective rolling pass.

For each pass, the artificial intelligence 9 has the contour of the roller gap and/or the roller barrels of the working rollers in the roller stand executing the respective rolling pass prescribed to it in spatially resolved fashion over the rolling material width. The spatial resolution is such that, when viewed over the rolling material width, the roller gap or the respective radius (or diameter) of the two working rollers over the rolling material width is prescribed for at least 5 points. Preferably, it is prescribed for at least 10 points. Furthermore, the artificial intelligence 9 is supplied with the cross section and/or the flatness of the flat rolling material after passage through the roller stands. The contours of the roller gaps, the cross section and the flatness of the flat rolling material can be displayed to the artificial intelligence 9 in particular by applicable images that are displayed to the operator 4 via the human-machine interface 3.

On the basis of these variables, the artificial intelligence 9 ascertains during operation—that is to say during rolling of the rolling material—an actuation for segmented working roller cooling in at least one of the roller stands, a movement to be set for the working rollers in at least one of the roller stands and/or bending-back to be set for the working rollers in at least one of the roller stands. The artificial intelligence 9 thus implements a strategy S2 for segmented cooling of rollers in at least one of the roller stands and/or a strategy S3 for working roller movement and/or a strategy S4 for working roller bending-back. The strategies S2, S3 and/or S4 thus constitute an intelligent controller.

This approach allows in particular contour characteristics and flatness characteristics of cold rolled metal strips to be optimized. The approach is also applicable for the hot rolling of strips, in particular for the hot rolling of aluminum strips, however.

Figure 8:
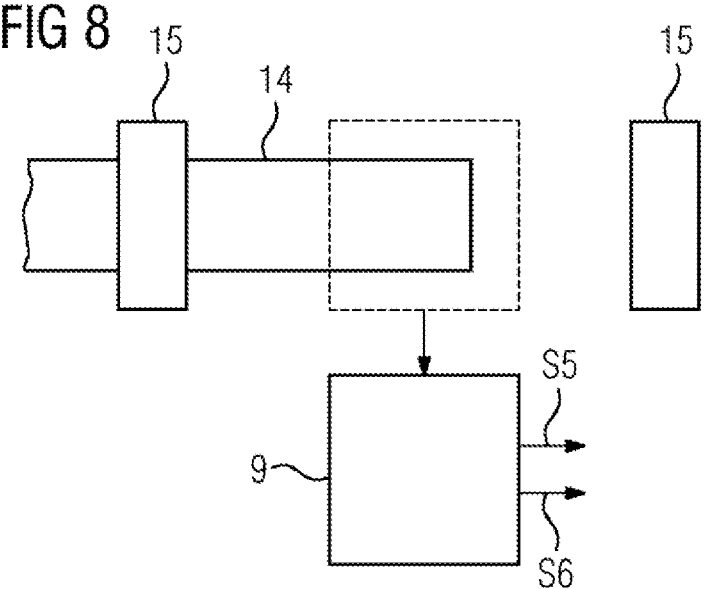

Also as shown in FIG. 8, the data accepted by the artificial intelligence 9 comprise at least an image among other things. The image shows the area between two successive roller stands 15 in a multi-stand rolling train. The image (visible spectrum or—preferably—infrared) need not necessarily contain the roller stands 15. It is merely necessary for the lateral position of the metal strip 14 to be ascertainable from the image. Furthermore, the artificial intelligence 9 is supplied with a difference manipulated variable of the upstream instance of the two roller stands 15. The difference manipulated variable can be a difference rolling force or a difference roller gap, for example.

It is possible that the image shows the head of the metal strip 14, that is to say that although the metal strip 14 has already left the upstream instance of the two roller stands 15, it has not yet reached the downstream instance of the two roller stands 15. In this case, the evaluation results A ascertained by the artificial intelligence 9 can comprise a strategy S5 for controlling the strip transit when threading in the metal strip 14. In particular, the strategy S5 can be determined such that the metal strip 14 enters the downstream roller stand 15 centrally and as far as possible without a transverse speed component. This approach can better avoid high transits, in particular.

It is likewise possible for the image to show the metal strip 14 while the metal strip 14 is clamped between the two roller stands 15. In this case, the evaluation results A ascertained by the artificial intelligence 9 can comprise a strategy S6 for controlling the strip transit (meandering) during "normal" rolling of the metal strip 14. This strategy involves the artificial intelligence 9, if possible, continuing to be supplied with a difference tension that prevails in the metal strip 14 between the two roller stands 15. The difference tension can be captured for example by means of a loop lifter arranged between the two roller stands 15. This approach can achieve in particular strip transit that is as central as possible.

If the metal strip 14 is clamped between the two roller stands, the applicable approach can also be carried out in parallel for multiple such roller stands at the same time. In this case, the artificial intelligence 9 is supplied with the applicable data (image, difference manipulated variable and possibly difference tension) for each roller stand on which the applicable approach is carried out. In this case, the artificial intelligence 9 can perform ascertainment of the difference manipulated variable across roller stands, in particular.

In both cases—both for ascertainment of the strategy S5 and for ascertainment of the strategy S6—the artificial intelligence 9 can be supplied with further pass schedule data. In both cases, the artificial intelligence 9 ascertains the difference rolling force or the difference setting—in general the difference manipulated variable—of the upstream roller stand 15. The aim of the ascertainment is to achieve optimum strip centering and flatness.

As shown in FIG. 9, the data accepted by the artificial intelligence 9 comprise among other things dimension data describing wear on a structural element of the primary industry plant ANL. The evaluation results A ascertained by the artificial intelligence 9 can, in this case, comprise a prediction V1 of a remaining operating time of the structural element of the primary industry plant ANL.

By way of example, the structural element can be a working roller in a roller stand. In this case, the data accepted by the artificial intelligence 9 comprise a roller barrel contour as a function of the roller travel of the working roller and the pass schedule data of the roller stand. The term "roller travel" has a firm meaning for a person skilled in the art. It is the total distance covered on the rolling material (or another rolling material) since installation of the rollers in the roller stand. As already explained above in conjunction with FIGS. 6 and 7, the roller barrel contour is spatially resolved over the length of the roller barrel. The roller barrel contour is preferably broken down into a basic contour, augmented by a contour change as a result of bending back and a contour change as a result of temperature effects and wear. Pass schedule data have likewise already been explained. On the basis of the data supplied to it, the artificial intelligence 9 can predict when the respective working roller (or the applicable set of rollers) needs to be changed. This prediction can be used for example for adapting and optimizing production planning, in particular during continuous rolling and semi-continuous rolling.

It is possible to perform the approach from FIG. 9 separately for each roller stand 15. Alternatively, it is possible to perform it across stands.

As shown in FIG. 10, the dimensional data accepted by the artificial intelligence 9 can comprise at least one value as set forth below.

The dimensional data can include at least a mass flow and/or at least a volume flow of a substance supplied to a converter vessel as a function of time. The substance can be, for example, a gas (oxygen, air, nitrogen, argon, . . . ) or a solid such as limestone, ore or others. For solids, it can suffice to specify in each case only individual times and the respective amount of solid supplied rather than a continuous time characteristic.

The dimensional data can include a position of a lance in the converter vessel as a function of time. The position can comprise the location as such and/or the orientation of the lance.

The dimensional data can include a cooling water temperature of the converter as a function of time.

The dimensional data can include an amount and/or a composition of an exhaust gas emerging from the converter vessel as a function of time. The amount and composition of the exhaust gas can be used in particular to draw conclusions about the progress of the process taking place in the converter vessel.

The dimensional data can include at least one acoustic vibration and/or the spectrum thereof originating from the area of the converter vessel. The acoustic vibration can be captured, for example, by means of a standard microphone (sound, noise) or as structure-borne sound (acoustic body vibration).

The dimensional data can include at least one image containing the area of a converter hood (visible spectrum or—preferably—infrared), often even a temporal sequence of such images. The image of the converter hood can contain, for example, the flames of the converter as well. The flames—in a similar manner to the amount and composition of the exhaust gas—can be used to draw conclusions about the progress of the process taking place in the converter vessel.

The dimensional data can include dimensional model data from a physico-chemical model of a metal in the converter vessel and/or previously determined comparison data corresponding thereto. These data can in particular be locally spatially resolved data. The spatial resolution can be two- or three-dimensional, in particular.

The dimensional data can include a spatially resolved representation of a converter lining condition.

Normally, the artificial intelligence 9 is supplied with multiple instances of the aforementioned data. However, the artificial intelligence 9 does not have to be supplied with all the data. Furthermore, the artificial intelligence 9 is often also supplied with further, non-dimensional data, such as what is known as the scrap rate, the type of scrap, the amount of scrap and the chemical analysis of the scrap, comparable information, including the temperature for the pig iron, data about a subjective appraisal of the expected and/or already manifested discharge behaviour by the operator 4, or other constraints such as humidity, ambient temperature and others. The data specifically supplied to the artificial intelligence 9 can differ from case to case.

The evaluation results A ascertained by the artificial intelligence 9 can in this case comprise a prediction V2 to V4 about a probability, a time and/or a level of expected discharge from the converter vessel. Alternatively or additionally, it is possible to use the artificial intelligence 9 to ascertain an expected final oxygen and/or carbon content of the metal in the converter vessel, a temperature of the metal in the converter vessel that is forecast for a tapping time, a result of a dephosphorization process in the converter vessel and/or metallurgical variables during a blowing process inside the converter vessel.

To ascertain the predictions V2 to V4, the artificial intelligence 9 can evaluate, for example, the variables supplied to it to the effect that it proposes or possibly even directly implements open- and closed-loop control commands in order to avoid converter discharge, for example. The open- and closed-loop control commands can comprise, for example, adjustment of the lance position, of a volume or mass flow of oxygen, time and amount of the addition of solid additives and the like. As such, for example, the addition of solid additives such as limestone or dolomite and the like, which are used for dephosphorization, is effected only in the lower temperature range of the process characteristic of the converter (up to no more than approximately 1600° C.). In this case, the artificial intelligence 9 can be faced with the task of using (among other things) the dimensional data—i.e. among other things using the acoustic vibrations and/or the spectrum thereof originating from the area of the converter vessel and/or using the image or the corresponding sequence of images that shows the converter hood—to ascertain the right time for adding the right amount of additive and of prescribing this to the operator 4. The ascertaining can be effected, for example, on the basis of the time characteristic of the mass flow, measured or ascertained with the assistance of a model, of carbon in the exhaust gas, of the temperature characteristic as a function of time (calculated or measured) and/or of the time characteristic of at least one vibration spectrum. Analogously, the artificial intelligence 9 can also ascertain other variables, such as a prescribed value for the lance position or the supply of oxygen. Known time profiles for the melt under similar constraints can be used comparatively to increase the likelihood of the statement ascertained by the artificial intelligence 9.

Furthermore, the artificial intelligence 9 can be used to make target variables in the temperature and chemical composition of the metal melt at the time of tapping more reproducible, to avoid re-blowing rates and the like. In particular, the dimensional data and further, non-dimensional data can be used to better achieve a target window for the temperature and the carbon content for the time of the tapping. For this purpose, for example, the time characteristic of the mass flow of oxygen and the time characteristic of the position of the lance can be used in conjunction with a measurement of the oxygen content and the temperature measurement. Reclassification of a melt (due to a chemical composition not being achieved) or return to the pig iron mixer or the converter (when the actual chemical composition differs from the desired one less) can be avoided.

Other applications are also readily possible. Examples of such applications are a wide variety of primary industry, in particular steel and metal-producing industry, plants such as a sintering plant, a direct reduction plant or a blast furnace. Secondary metallurgy plants such as vacuum plants (RH or VD), ladle furnaces, AOD converters, VOD plants, alloying and homogenization stands, a continuous casting plant or a rolling mill (hot rolling mill, possibly including the heating furnaces, cold rolling mill, process lines) are possible. In the case of an arc furnace, for example, the artificial intelligence 9 can be supplied with one or more of the following dimensional data:

at least a mass flow and/or at least a volume flow of a substance supplied to the arc furnace as a function of time,
a position of the arc electrodes as a function of time,
performance profiles or transformer switching stages as a function of time,
a flicker signal, brought about by operation of the arc furnace, as a function of time and/or the spectrum of said flicker signal,
a transformer temperature as a function of time,
a condition of the supply network as a function of time,
a cooling water temperature of the arc furnace as a function of time,
an amount and/or a composition of an exhaust gas emerging from the arc furnace as a function of time,
at least one acoustic vibration originating from the area of the arc furnace (this too can alternatively be airborne sound or structure-borne sound) and/or the spectrum of said acoustic vibration,
at least one image containing the area of the top side of the arc furnace (visible spectrum or—preferably—infrared, for example for evaluating a flame, in particular as a function of time),
dimensional model data from a physico-chemical model of a metal in the converter vessel and/or previously determined comparison data corresponding thereto and/or
a spatially resolved representation of a feed condition of the arc furnace.

Normally, the artificial intelligence 9 is supplied with multiple instances of the aforementioned data. However, the artificial intelligence 9 does not have to be supplied with all the data. Furthermore, the artificial intelligence 9 is often also supplied with further, non-dimensional data, such as what is known as the scrap rate, the type of scrap, the amount of scrap and the chemical analysis of the scrap, comparable information, including the temperature for the pig iron, data about a subjective appraisal of the expected and/or already manifested foaming behaviour of the slag in the arc furnace by the operator 4, or other constraints such as humidity, ambient temperature and others. The data specifically supplied to the artificial intelligence 9 can differ from case to case.

In the case of an arc furnace, it is, for example, possible for the artificial intelligence 9 to propose or possibly even directly implement open- and closed-loop control commands in order to achieve, for example, minimum electrode combustion, minimum energy consumption, the least possible network reaction, avoidance of hazardous conditions (for example, ingress of water into the arc furnace) and the like. The open- and closed-loop control commands can comprise, for example, adjustment of the electrode position, of a switching stage of the furnace transformer, of an operating voltage or of an operating current and the like. Supply of a fuel gas (for example, natural gas) and/or of oxygen is also possible. Ascertainment can be effected, for example, on the basis of the temperature characteristic as a function of time (calculated or measured) and/or on the basis of the time characteristic of at least one flicker spectrum or THD spectrum (THD=total harmonic distortion) or other, also acoustic, vibration spectrum. Known time profiles for the melt under similar constraints can be used comparatively to increase the likelihood of the statement ascertained by the artificial intelligence 9.

It is also possible for the artificial intelligence 9 to be supplied with dimensional data (and additionally often also non-dimensional data) across plants, for example, with data from a blast furnace or an arc furnace and data from a ladle furnace and data from a continuous casting plant and data from a rolling mill. It is thus possible for the artificial intelligence 9 to optimize operations even across plants. It is also possible for the artificial intelligence 9 to be supplied with, in addition to the dimensional data (and possibly also non-dimensional data) of the respective primary industry plant, comparable data of another primary industry plant and to have additionally these too evaluated by the artificial intelligence 9.

The artificial intelligence 9 is in practice often involved in a comprehensive data processing plan. This is explained in more detail below in connection with FIG. 11.

An overall intelligence 16 can comprise a single artificial intelligence 9 or, as depicted in FIG. 11, multiple artificial intelligences 9. The single artificial intelligences 9 can be in a form as explained above. In principle any combinations of different configurations of artificial intelligences 9 are possible. The form of the artificial intelligences 9 as neural networks that is shown in FIG. 11 is thus just exemplary. The artificial intelligences 9 can, according to the depiction in FIG. 11, be arranged in parallel with one another. Additionally, further components 17 can be present within the overall intelligence 16, for example, a model or a rules-based system. It is possible to preprocess the data (this admittedly applies not only, but probably also, to the dimensional data) in a preprocessing device 18 before they are supplied to the overall intelligence 16. The preprocessing can be filtering or static or dynamic averaging, for example. Error correction, normalization and/or structuring of the input data can also be effected. Furthermore, the overall intelligence 16 can have a downstream evaluation device 19. In this case, the results ascertained by means of the overall intelligence 16 are used to effect a further evaluation. This evaluation as such does not have to meet the requirements placed on an artificial intelligence. Furthermore, the overall intelligence 16 can have—in addition or as an alternative to the evaluation device 19—a downstream optimization device 20. The optimization device 20 can be used to compare, for example, multiple similar results of the overall intelligence 16 and, further, to evaluate them for the purposes of optimization. The overall arrangement from FIG. 11 is controlled by a data flow control device 21.

In summary, a method according to the present invention, therefore, can relate to an automation system 1 that ascertains control data S', outputs them to controlled elements 5 of the plant ANL and controls the plant ANL thereby. Sensor devices 2 capture measurement data M of the plant ANL, at least some of which they supply to the automation system 1 and a human-machine interface 3. The human-machine interface 3 furthermore accepts planning data P of a production planning system 11 and/or control data S' and/or internal data I from the automation system 1. It outputs the data M, S', I to a person 4. Furthermore, it accepts control commands S from the person 4 and forwards them to the automation system 1. The automation system 1 processes the measurement data M and the control commands S when ascertaining the control data S'. An artificial intelligence 9 accepts at least some of the measurement data M, the control data S' and/or the internal data I and the data output to the person 4. It further accepts the control commands S. The artificial intelligence 9 uses the data M, S', I and commands S accepted by it to ascertain evaluation results A and makes these available to the person 4 and/or the production planning system 11 and/or prescribes the evaluation results A to the automation system 1 directly or via the human-machine interface 3 in the form of control commands S". At least some of the data M, S', I accepted by the artificial intelligence 9 are dimensional data. The dimensional data comprise at least an image captured by a sensor device 2 or an image output via the human-machine interface 3, a portion of such an image, a temporal sequence of such images or a temporal sequence of a portion of such images or an acoustic vibration or a spectrum of an acoustic vibration.

A method according to the present invention has many advantages. In particular, a method according to the present invention, increases the robustness of a plant operation; ensures the productivity and product quality at a high level; and reduces the manual control interventions of the person 4 that are required in the prior art, and ideally eliminates the manual interventions completely. The inventive approach additionally also reduces the psychological burden on the person 4. There is thus a lower risk of incorrect operation by the person 4. The invention is not only viable for new plants ANL but can also be retrofitted in existing plants ANL. It is no longer possible for a change of generation of the operating personnel to result in knowledge about control and operation of the primary industry plant ANL being lost. This also applies to knowledge that, in the prior art, is accumulated by a few experienced operators 4, but otherwise not documented. Commissioning of a new plant ANL is often possible more quickly, for example. Furthermore, it is also possible for staff with less knowledge of the plant ANL to be employed. Furthermore, staff can also be trained more quickly. The time for reacting to altered operating conditions is often shortened. Finally, personnel expenses as a whole are much reduced.

Although the invention has been illustrated and described in more detail by the preferred exemplary embodiment, the invention is not limited by the examples disclosed, and other variations can be derived therefrom by a person skilled in the art without departing from the scope of protection of the invention.

LIST OF REFERENCE SIGNS

1 automation system
2 sensor devices
3 human-machine interface
4 person
5 controlled elements of the plant
6 computing device
7 computer program
8 machine code
9 artificial intelligence
10 independent output device
11 production planning system
12 curves of equal value
13 gradients
14 metal strip
15 roller stands
16 overall intelligence
17 further components
18 preprocessing device
19 evaluation device
20 optimization device
21 data flow control device
A evaluation results
ANL plant
a output neurons
B rating
C confirmation command
D data
e input neurons
I internal data
L barrel length
M measurement data
n hidden neurons P planning data
R base radius
S, S" control commands
S' control data
s layers
S1 to S6 strategies
V1 to V4 predictions
δR crowning

The invention claimed is:

1. A method of operating a primary industry plant (ANL) having an automation system that ascertains control data (S') and outputs the control data (S') to controlled elements of the plant (ANL) and controls the plant (ANL) thereby, the method comprising:
   capturing with sensor devices measurement data (M) of the plant (ANL),
   accepting by the automation system at least some of the measurement data (M) and taking the accepted measurement data (M) into consideration when ascertaining the control data (S'),
   outputting with a human-machine interface to a person at least some of the measurement data (M) of the sensor devices, and at least some of the control data (S') of the automation system, and accepting control commands (S) from the person, and forwarding the control commands (S) to the automation system,
   ascertaining the control data (S') with the automation system based on the forwarded control commands (S),
   accepting by an artificial intelligence, that is enabled by non-transitory code residing on a non-transitory computer-readable medium of a computing device, at least some of the measurement data (M) of the plant (ANL) from the sensor devices, the control data (S') and internal data (I) of the automation system from the automation system and the data output to the person with the human-machine interface and accepting by the artificial intelligence the control commands (S) from the human-machine interface or the automation system,
   ascertaining with the artificial intelligence evaluation results (A) using the accepted data (M, S', I) and commands (S) and outputting the evaluation results (A) to an apparatus,
   wherein at least some of the data (M, S', I) accepted by the artificial intelligence are dimensional data,
   wherein the dimensional data (M, S', I) comprise at least one option selected from an image captured by a sensor device, an image output to the person via the human-machine interface, a temporal sequence of such images, a portion of such an image or a temporal sequence of such a portion, an acoustic vibration, and a spectrum of an acoustic vibration.

2. The method of operating as claimed in claim 1, wherein at least some of the dimensional data (M, S', I) extend in at least two dimensions, and wherein the artificial intelligence ascertains curves of equal value, or gradients, when ascertaining the evaluation results (A) for the dimensional data (M, S', I).

3. The method of operating as claimed in claim 2, wherein the at least two dimensions is at least two local dimensions.

4. The method of operating as claimed in claim 1, wherein the dimensional data (M, S', I) comprise data calculated by the automation system on the basis of a model.

5. The method of operating as claimed in claim 1, wherein the artificial intelligence is selected from an artificial neural network, a deep neural network, a convolutional neural network, a support vector machine, a decision tree, a Bayesian belief network, a self-organizing map, case-based reasoning, instance-based learning, a hidden Markov model, and k-nearest neighbors.

6. The method of operating as claimed in claim 1, wherein the artificial intelligence, in parallel with the ascertainment of the evaluation results (A), ascertains a rating (B) for the evaluation results (A) and retrains itself on the basis of the rating (B).

7. The method of operating as claimed in claim 1, wherein the data (M, S', I) accepted by the artificial intelligence, or the relationship of said data in the dimension are/is unitless, or converted into unitless data by the artificial intelligence.

8. The method of operating as claimed in claim 1, wherein the data (M, S', I) accepted by the artificial intelligence comprise at least an image, on the basis of which the lateral position of a metal strip between two roller stands in a multi-stand rolling train is ascertainable, and a difference manipulated variable of the upstream instance of the two roller stands, and wherein the evaluation results (A) ascertained by the artificial intelligence comprise a strategy (S5) for controlling the strip transit.

9. The method of operating as claimed in claim 1, wherein the data (M, S', I) accepted by the artificial intelligence comprise dimensional data describing a wear on a structural element of the primary industry plant (ANL) and wherein the evaluation results (A) ascertained by the artificial intelligence comprise a prediction (V1) of a remaining operating time of the structural element of the primary industry plant (ANL).

10. The method of operating as claimed in claim 9, wherein the structural element is a working roller of a roller stand and wherein the data (M, S', I) accepted by the artificial intelligence comprise a roller barrel contour as a function of the roller travel of the working roller, and the pass schedule data of the roller stand.

11. The method of operating as claimed in claim 1, wherein the data (M, S', I) accepted by the artificial intelligence comprise at least one data set from,
   at least a mass flow and/or at least a volume flow of a substance supplied to a converter vessel as a function of time,
   a position of a lance in the converter vessel as a function of time,
   a cooling water temperature of the converter as a function of time,
   an amount and/or a composition of an exhaust gas emerging from the converter vessel as a function of time,
   at least one acoustic vibration, a spectrum of acoustic vibrations originating from the area of the converter vessel,
   at least one image containing the area of a converter hood,
   dimensional model data from a physico-chemical model of a metal in the converter vessel, or previously determined comparison data corresponding thereto, and
   a spatially resolved representation of a converter lining condition, and
   wherein the evaluation results (A) ascertained by the artificial intelligence comprise at least one evaluation result selected from a prediction (V2 to V4) of a probability, a time, a level of expected discharge from the converter vessel, an expected final oxygen, carbon content of the metal in the converter vessel, a temperature of the metal in the converter vessel that is forecast for a tapping time, a result of a dephosphorization process in the converter vessel, and metallurgical variables during a blowing process inside the converter vessel.

12. The method of operating as claimed in claim 1, wherein the dimensional data (M, S', I) supplied to the artificial intelligence are preprocessed in a preprocessing device (18) before being supplied to the artificial intelligence, or the evaluation results (A) ascertained by the artificial intelligence are initially evaluated in an evaluation device or by an optimization device for the purposes of an optimization, and only then are made available to the person, to the production planning system, or prescribed to the automation system.

13. The method of operating as claimed in claim 1, wherein the apparatus is the human machine interface.

14. The method of operating as claimed in claim 1, wherein the apparatus is an independent output device.

15. The method of operating as claimed in claim 1, wherein the apparatus is the automation system.

16. The method of operating as claimed in claim 15, wherein the evaluation results are output directly to the automation system, or indirectly via the human-machine interface in the form of control commands (S☐).

17. The method of operating as claimed in claim 1, wherein the apparatus is a production planning system.

18. The method of operating as claimed in claim 1, further comprising outputting with a human-machine interface planning data (P) of a production planning system to a person.

19. The method of operating as claimed in claim 1, further comprising accepting by an artificial intelligence control commands (S) from the automation system.

20. A computer product that comprises non-transitory machine code executable by a computing device and residing on a non-transitory computer-readable medium, wherein the execution of the machine code by the computing device causes the computing device to implement an artificial intelligence that
  accepts at least some measurement data (M), which are captured by sensor devices of a primary industry plant (ANL) during operation of the primary industry plant (ANL), control data (S') and internal data (I), which are ascertained by an automation system controlling the primary industry plant (ANL) and, in the case of the control data (S') for controlling the primary industry plant (ANL), are output to controlled elements of the primary industry plant (ANL), and data output to a person by a human-machine interface of the primary industry plant (ANL),
  accepts control commands (S) forwarded by the human-machine interface or the automation system of the human-machine interface to the automation system,
  uses the accepted data (M, S', I) and commands (S) to ascertain evaluation results (A) and makes the evaluation results (A) available to an apparatus the person via the human-machine interface, an independent output device, and a production planning system for the primary industry plant (ANL), or prescribes them to the automation system directly or via the human-machine interface in the form of control commands (S"),
  wherein at least some of the data (M, S', I) accepted by the artificial intelligence are dimensional data,
  wherein the dimensional data (M, S', I) comprise at least one option selected from an image captured by a sensor device, an image output to the person via the human-machine interface, a temporal sequence of such images, a portion of such an image, or a temporal sequence of such a portion, an acoustic vibration, and a spectrum of an acoustic vibration.

21. A computing device, wherein the computing device is programmed with a computer program as claimed in claim 20, and for the purpose of transmitting information, is connected at least to one selected from the automation system, sensor devices and the human-machine interface of the primary industry plant (ANL).

22. A primary industry plant, comprising:
  an automation system that ascertains control data (S') and outputs them to controlled elements of the plant and controls the plant thereby,
  sensor devices that capture measurement data (M) of the plant,
  wherein the automation system accepts some of the measurement data (M) and takes the accepted measurement data (M) into consideration when ascertaining the control data (S'),
  wherein the plant has a human-machine interface that outputs at least some of the measurement data (M) of the sensor devices, and at least some of the data (S', I) of the automation system to a person and accepts control commands (S) from the person and forwards them to the automation system,
  wherein the automation system takes the forwarded control commands (S) into consideration when ascertaining the control data (S'),
  wherein the plant has a computing device as claimed in claim 21.

23. The computer product as claimed in claim 20, wherein the apparatus is the human machine interface.

24. The computer product as claimed in claim 20, wherein the apparatus is an independent output device.

25. The computer product as claimed in claim 20, wherein the apparatus is the automation system.

26. The computer product as claimed in claim 20, wherein the apparatus is a production planning system.

27. The computer product as claimed in claim 20, wherein the artificial intelligence outputs with a human-machine interface planning data (P) of a production planning system to a person.

* * * * *